March 15, 1955  S. S. PRENTISS  2,703,960
ROCKET

Filed Aug. 31, 1953  4 Sheets-Sheet 1

FIG. I.

INVENTOR.
S. S. PRENTISS
BY Hudson & Young
ATTORNEYS

March 15, 1955     S. S. PRENTISS     2,703,960
ROCKET

Filed Aug. 31, 1953     4 Sheets-Sheet 2

INVENTOR.
S. S. PRENTISS
BY Hudson & Young
ATTORNEYS

March 15, 1955   S. S. PRENTISS   2,703,960
ROCKET

Filed Aug. 31, 1953   4 Sheets-Sheet 4

INVENTOR.
S. S. PRENTISS
BY Hudson & Young
ATTORNEYS

United States Patent Office 2,703,960
Patented Mar. 15, 1955

2,703,960
ROCKET

Spencer S. Prentiss, Bartlesville, Okla., assignor to Phillips Petroleum Company, a corporation of Delaware Application August 31, 1953, Serial No. 377,476

19 Claims. (Cl. 60—35.6)

This invention relates to rockets employing a solid rocket propellant. In one aspect it relates to rockets having a chamber with a grate disposed across said chamber adjacent to the nozzle to provide a fixed volume space for gas. In another aspect it relates to rockets in which a solid propellant is continuously biased against a grate in the rocket chamber. In another aspect it relates to rockets having end-burning grain propellants.

In the prior art of rockets employing solid propellants many disadvantages occur due to uneven burning of the solid propellant, and variations in the thrust of the gases emerging from the nozzle of the rocket. These variations are often so abrupt and violent as to result in the explosion of the combustion chamber of the rocket and the destruction of surrounding life and property. If the solid propellant becomes loose in the combustion chamber, it is likely to be subject to movement followed by collision with the chamber wall resulting in a sudden shock splitting the propellant and thereby increasing the area of burning to an extent resulting in rapid increase in pressure and an explosion. If the volume of space between the nozzle and the burning propellant increases or decreases it affects the amount of thrust of the gases coming out the nozzle and makes the flight of the rocket erratic and the range of flight uncertain.

The present invention overcomes these disadvantages of the prior art as will be explained below.

One object of this invention is to have the burning face of an end-burning propellant remain in fixed position.

Another object is to keep the burning portion of the propellant adjacent to the outlet nozzle during the entire burning period so that the walls of the rocket except in the vicinity of the nozzle will not be exposed to the highest temperatures produced.

Another object is to provide a rocket in which the internal configuration is constant so that the combustion will tend to be as constant and stable as is possible in the combustion of rocket propellant, and the thrust of the gases emerging from the nozzle will be as constant as possible.

Numerous other objects and advantages will be apparent to those skilled in the art upon reading the accompanying specification, claims and drawings.

Figure 1:
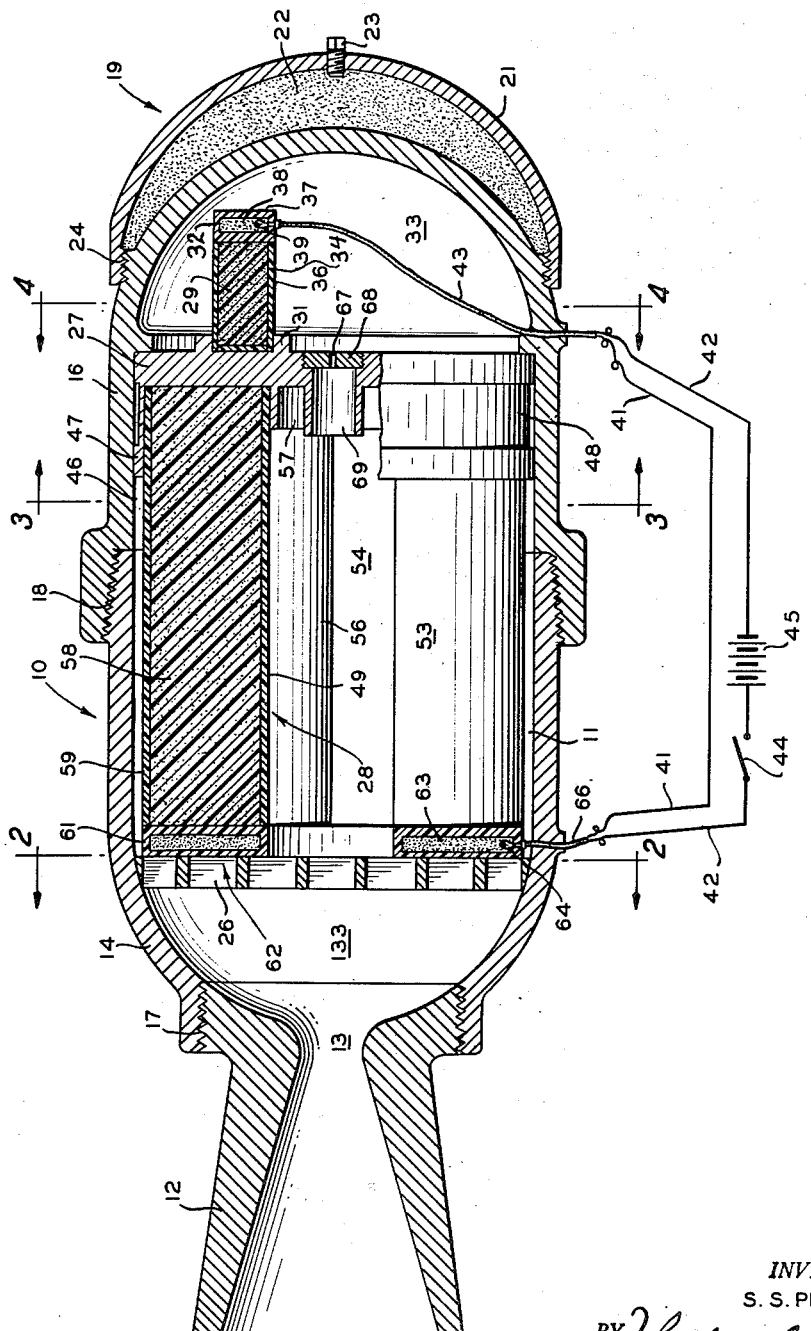
Figure 1 is a cross-sectional elevational view taken through the longitudinal axis of a rocket embodying the present invention.

In Figure 1 is shown a rocket generally designated as 10 comprising, in combination, a cylindrical combustion chamber 11 having an axially disposed exhaust nozzle 12 preferably of the conventional venturi orifice construction 13. The walls of the combustion chamber 11 are shown as several separable parts, nozzle 12, base 14, and nose 16 being shown connected together by suitable means, such as screw threads 17 and 18, but obviously these parts can all be made integral if desired. However, it is advantageous to make them separable as shown because of ease of assembly, and also because the nose 16 can then be made of much less expensive material than the base 14, and the base 14 of less expensive material than nozzle 12, because they are progressively subjected to hotter gases at higher velocities toward the nozzle.

While not necessary to the operation of the device as a rocket, it is conventional to provide a pay load, which may be scientific instruments (not shown), or any load, such as the war head generally designated as 19 which comprises a nose, or wind cone 21, a supply of high explosives 22, and a conventional impact detonator 23. War head 19 may be attached by any suitable means such as screw threads 24. The detonator 23 may be an impact type, time fuse type, or proximity type fuse (not shown) all old in the prior art.

A grate 26, consisting of a grid, or other suitable arrangement, of metal rods or bars (shown integral in the drawing, but not necessarily integral) is disposed across said chamber adjacent to, and at a predetermined distance from, said nozzle 12, a piston member 27 is provided in said chamber 11 on the other side of said grate 26 from said nozzle 12 and is adapted to move in said chamber. Solid rocket propellant 28 is disposed between said grate 26 and said piston member 27.

A solid combustion-gas producing material 29 is disposed in said chamber 11 on the opposite side of said piston member 27 from said propellant 28. This material 29 may be in the form of an end-burning grain, and may be secured to the piston at 31 as shown, or can be secured to nose 16 (not shown). While other combustion-gas producing material may be employed at 29 of a nature less actively burning than the rocket propellant 28, or of some other nature, in many instances material 29 can be the same as rocket propellant 28.

Means 32 is provided to ignite said combustion-gas producing material 29 whereby the resulting combustion gas pressure in space 33 will move said piston 27 to bias said propellant 28 against grate 26 continuously until said propellant is consumed.

While combustion-gas producing material 29 can have various forms in carrying out the invention, it is preferred to have an end-burning grain 34 of smokeless powder surrounded by a burning inhibited case 36 composed of cellulose acetate, or ethyl cellulose, or other suitable slow burning material. In a similar manner ignition means 32 preferably consists of a casing 37 of slowly burning material containing a charge 38 of an ignition material such as gun powder of the size used as a propellant for military rifle cartridges, for example.

The powder 38 is ignited by electrical ignition wire 39 becoming incandescent due to electric current passed through wires 41, the filament 39 and wire 42 or cable 43 from a battery 45 when firing switch 44 is closed. Wires 41 and 42 are quite weak in tension, or are provided with points at which they will break off easily, so that the rocket will disconnect from them as it takes off in flight.

Piston member 27 may be a flat plate but preferably made of sufficient width so that it will not tend to stick or jam in moving in cylinder 46, and this may be done by providing a skirt 47 an intermediate portion 48 of which may be cut away from contact with cylinder 46 to avoid friction.

Disposed between piston member 27 and grate 26 is the propellant 28 which is shown (see Figure 3) as a hollow array of six cylindrical end burning grains having their longitudinal axis parallel to the longitudinal axis of the rocket and disposed at the vertices of an equilateral hexagon concentric to the rocket axis. The six end burning grains are numbered 49, 51, 52, 53, 54 and 56. The forward end of the six grains may be secured in any suitable manner to piston member 27, such as by being held by friction between skirt 47 and an annular flange 57.

Each of the end burning grains such as 49 is preferably composed of a suitable rocket propellant 58, such as smokeless powder, or 75/25 ammonium nitrate in rubber binder composition, or other rocket propellant known to the prior art, surrounded by any suitable slow burning or burning inhibited cylindrical pipe or case 59. The rear end of grain 49 need not be secured as it will be pressed against grate 26 as it burns which will steady the position of the same, however, I prefer to initially stabilize the rear end of the grains 49, 51, 52, 53, 54 and 56 by cementing them to an annular case 61 of the propellant ignition means generally designated as 62. Case 61 can be secured to case 58 any suitable plastic cement, or rubber cement, and the annular shape of 61 will act to position and stabilize the ends of the propellant grains. Igniter 62 consists of case 61 of slow burning material filled with rifle powder or other ignition material 63 which is similar to material 38 and which is ignited by an ignition wire 64 similar to wire 39 which ignition wire is connected to a battery 45 by wires 41 and 42 in cable 66 when switch 44 is closed.

Figure 9:
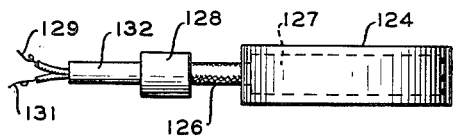
Figure 9 is an elevational view of a time delay firing mechanism for delaying the ignition of the rocket propellant until the combustion in gas producing material has had an opportunity to create an initial gas pressure.

While ignition wires 39 and 64 have been shown in series, they could be connected to battery 45 in parallel (not shown) as well understood by electrical engineers. Especially when conected in parallel, it is feasible to choose the size of filament 39 so that it is smaller in diameter than filament 64 and will cause the ignition of powder 38 before powder 63 ignites so that gas pressure can be generated in chamber 33 before the propellant is ignited. However, it is preferred to delay the ignition of propellant 28 by other means, such as shown in Figure 9. In many instances, however, valuable results can be obtained by having primer 38 ignite combustion-gas producing 29 and primer 63 ignite propellant 28 simultaneously.

In some instances it may be found that the pressure from combustion-gas producing means 29 will rise too high in chamber 33 unless some means of relief is provided, and in such cases, I may provide a relief orifice 67, shown in an insert 68 threaded in piston member 27. If desired, a stack 69 may be provided to aid in directing gases emerging from orifice 67 away from the grains of propellant.

Figure 2:
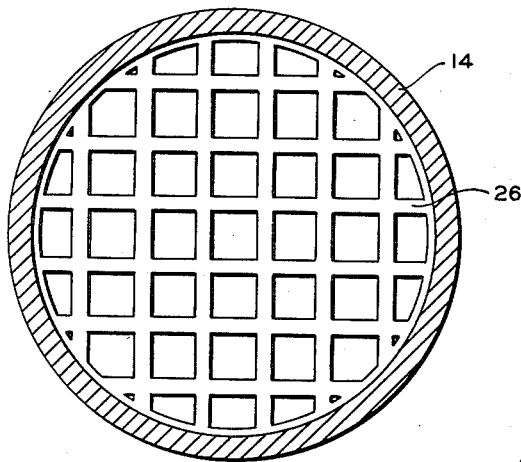
Figure 2 is a cross-sectional view taken along the line 2—2 of Figure 1 looking in the direction indicated.
Figure 3:
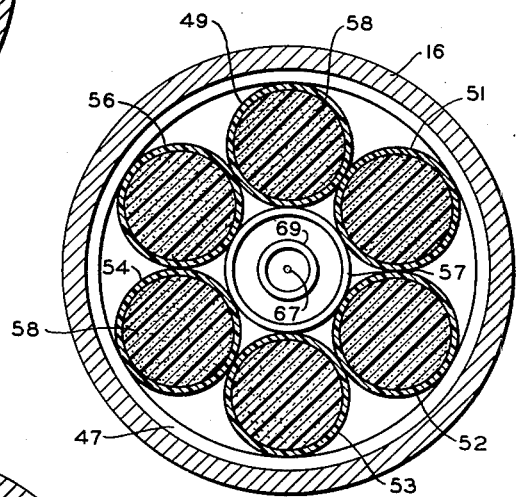
Figure 3 is a cross-sectional view taken along the line 3—3 of Figure 1 looking in the direction indicated.
Figure 4:
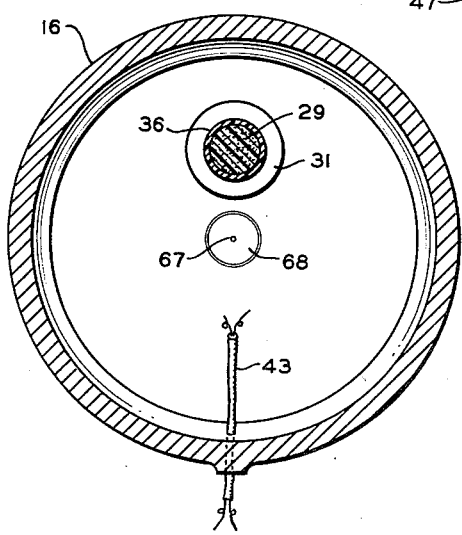
Figure 4 is a cross-sectional view taken along the line 4—4 of Figure 1 looking in the direction indicated.

Figures 2 to 4 inclusive are self-explanatory, merely being cross sections of Figure 1.

Figure 5:
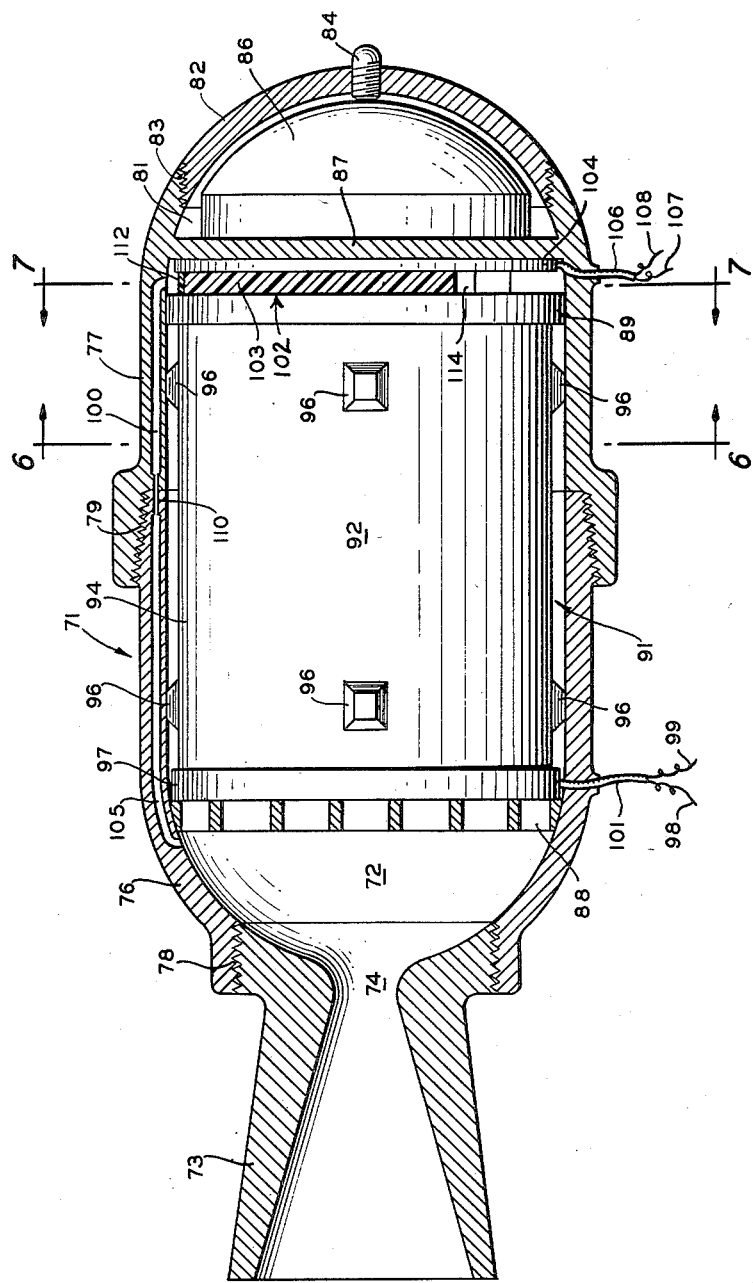
Figure 5 is a cross-sectional elevational view of a second modified form of rocket embodying the present invention, the view being taken along the line 5—5 of Figure 7.

In Figure 5 is shown a rocket generally designated as 71 comprising, in combination, a cylindrical combustion chamber 72 having an axially disposed exhaust nozzle 73 preferably with a conventional venturi orifice 74. The walls of the combustion chamber 72 are formed as several separable parts, nozzle 73, base 76, and nose 77 connected together by suitable means such as screw threads 78 and 79. A war head chamber 81 is formed in the nose 77 and is closed by a cover plate 82 secured thereto by screw threads 83. Screwed in the nose of cover 82 is a detonator 84 which may be of the impact type, time fuse type, or proximity fuse type, disposed to explode charge 86, which may be high explosive, or some smoke producing chemical, or some chemical for producing toxic gases, or the like.

Nose 77 has a partition 87 separating the war head chamber 81 from the combustion-chamber 72. A grate 88 is provided at a predetermined distance from nozzle 73 and a piston member 89 made of non-inflammable material, preferably metal, is provided slideable along the cylinder walls of chamber 72 between grate 88 and partition 87.

Between piston member 89 and grate 88 is secured the propellant generally designated as 91. The propellant is a single end burning cylindrical grain 92 of suitable propellant material 93 surrounded by a cylindrical casing of suitable slow burning material 94. To reduce friction, grain 92 can be of a less diameter than chamber 72 and be spaced from the walls thereof by spacing lugs, or legs, 96 which may be either secured to, or integral with, the slow burning casing 94. Ignition means 97 is provided between propellant 91 and grate 88, and this ignition means 97 is the same as ignition means 62 of Figure 1 except that 97 is disk shaped whereas 62 was washer shaped. Ignition means 97 may be fired by an electrical signal through wires 98 and 99 of cable 101.

Between piston member 89 and partition 87 is a combustion-gas producing means generally designated as 102 which comprises a uniform burning-area grain 103 and an ignition means 104 (similar to ignition means 97) having a similar cable 106 containing wires 107 and 108.

In Figure 5 instead of having an orifice 67 as in Figure 1 in the piston member 27, it is preferred either to have no orifice at all, or to have a passage 100 and 105 in the walls of the chamber which passages communicate together, and which may have restricted portion 110 if desired.

Figure 7:
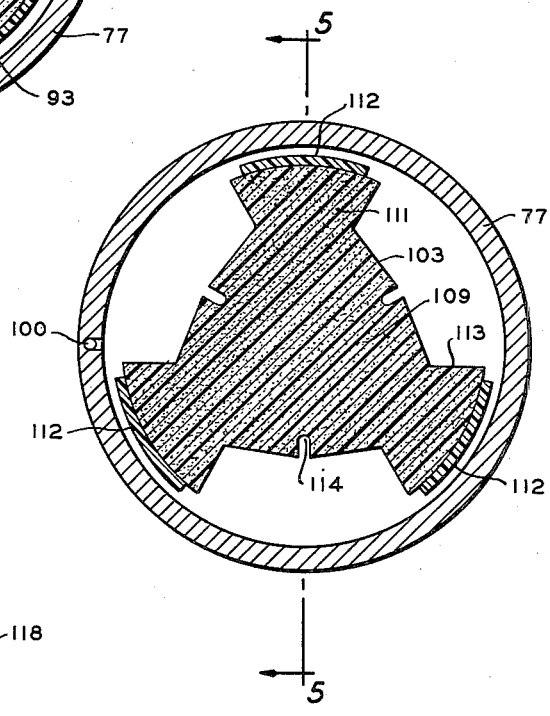
Figure 7 is a cross-sectional view taken along the line 7—7 of Figure 5 looking in the direction indicated.

The uniform-burning area grain 103 is best seen in Figure 7 where it will be seen to comprise a solid body 109 of smokeless powder or other suitable combustion-gas producing material cut in the peculiar ribbed and grooved form shown with the ends of the ribbed portions 111 having longitudinal strips of slow burning material 112 secured thereto. With the shape shown when the end of the grain 109 and the side walls 103, 113, and groove 114 are ignited, the future shape and size of the burning grain as it burns away will always have approximately the same area until it is substantially all consumed, and therefore it will tend to produce combustion-gas at a constant rate and constant pressure during its entire combustion period.

Figure 6:
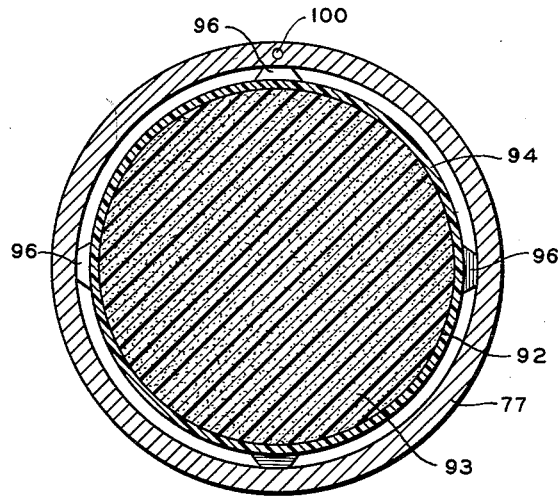
Figure 6 is a cross-sectional view taken along the line 6—6 of Figure 5 looking in the direction indicated.

As Figures 6 and 7 are merely cross-sections of Figure 5, further description is unnecessary.

Figure 8:
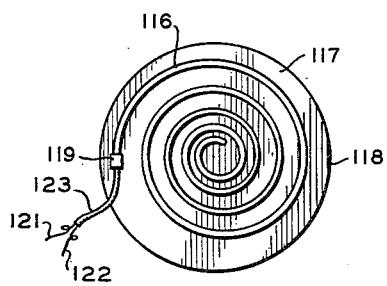
Figure 8 is an end view of a third modified piston which could be employed in place of the piston in either Figures 1 or 5.

In Figure 8 is shown a third modification of the construction of the combustion-gas producing means. In Figure 1, the combustion-gas producing means 29 was an end burning grain propellant, whereas in Figures 5 and 7, it was a constant burning area grain, and in Figure 8 it is spiral burning fuse of a combustion-gas producing material 116 disposed as a spaced spiral on face 117 of piston member 118, which may be ignited by ignition means 119 similar in form although smaller than ignition means 32 of Figure 1 which may be set off by an electrical current through wires 121 and 122 of cable 123. It burns around the spiral without the flame jumping the space between flights of the spiral, thus producing constant pressure.

In Figure 9, an ignition means 124 is shown similar to ignition means 61 of Figure 1 or 97 of Figure 5. However, in Figure 9, there is a time delay fuse 126 between powder chamber 127 of ignition means 124 and the primer 128 which is similar in construction to ignition means 32 of Figure 1 except smaller. Primer 128 contains an electrical filament similar to filament 64 but not shown, which filament is fired by electrical current passing from wire 129 to wire 131 through said filament, the wires being contained in cable 132.

*Operation*

Referring to Figure 1, rocket 10 is carefully positioned and then at the appointed time switch 44 is closed. Current from battery 45 flows through ignition wires 39 and 64 setting off priming charge 38 and 63 respectively. In some instances, it may be preferable to ignite charge 38 first in order to bias piston member 27 against propellant 28 before charge 63 ignites the same, and in such cases primer 124 of Figure 9 with time delay fuse 126 can replace 61 of Figure 1. However, in many cases, it is sufficient to ignite combustion-gas producing material 29 at the same time as propellant 28 is ignited.

Propellant 28 being in the form of an end burning grain, only burns adjacent grate 26, the propellant 58 evolving gas under high pressure it passes into a space of fixed volume 133 before passing through nozzle 12, thereby producing uniform pressure and flow of gas which results in steadier combustion and flight of the rocket, less chance of premature explosion, and greater predictability of its range. If the propellant material 58 burns against grate 26, or in the immediate vicinity thereof, just enough of slow burning case 59 is destroyed by adjacent combustion to allow the combustion to continue on the end of the end-burning grain, but the casing 59 at all other points on the cylindrical surface of the grain prevents ignition at these other points. As the cross section is uniform the burning-area does not increase, but remains constant, and therefore, the temperature, pressure and volume of gas being produced per unit of time, all remains constant, which gives better rocket performance as stated above. Combustion-gas producing material 29 continues to burn during the burning period of propellant 28 and constantly biases piston member 27 to force the remains of propellant 28 against grate 26 until it is completely consumed.

Rocket 10 then proceeds as a projectile until such time as detonator 23 is actuated by impact, passage of time, or proximity to another object, depending on what type detonator is employed at that time.

The operation of Figure 5 is similar except that while combustion-gas producing material 103 is not an end burning grain, it is a constant burning-area grain, propellant 92 is a single end burning grain, and excess gas in the spaces between partition 87 and piston member 89 escapes through passages 100, 105 and 110 instead of through passage 67 of Figure 1.

In the operation of Figure 8, the electrical primer 119 fires an even burning spiral fuse 116 which provides the combustion-gas for biasing piston member 27 of Figure 1 or 89 of Figure 5 for which piston member 118 can be substituted.

In the operation of Figure 9 ignition means 124 may be substituted for 61 of Figure 1 or 97 of Figure 5 so that when an electrical charge is sent through wires 129 and 131 and at the same time through wire 39 of Figure 1 or wires 107 and 108 of Figure 5 there will be a delay before 124 ignites, over the time of ignition of 36 of Figure 1 or 104 of Figure 5, which will allow gas to be produced in chamber 33 of Figure 1 or the corresponding space in Figure 5 to bias the piston member 27 or 89 against the propellant before 124 ignites the propellant. This is done by having a time fuse 126 which is ignited by primer 128, and then in due time fires the ignition charge 124.

*Example*

A 72/25 ammonium nitrate-rubber binder composition can be expected to have the following empirical formulation:

$$C_{0.327}H_{1.154}O_{0.567}N_{0.187}$$

This may be considered as the constitution of one mol of the gasifying fuel, and 16.76 gms. (one gram-mol) will produce 22.4 litres of the following combustion gases:

$$0.192CO + 0.291H_2 + 0.195H_2O$$
$$+ 0.187N_2 + 0.045CH_4 + 0.090CO_2$$

This amounts to 1.33 litres per gram at 273 K. The reaction takes place at 1200 K; allowing for some heat loss to the walls, it is assumed that roughly 4.0 liters (atmos. press.) is produced per gram of fuel.

Assuming a grain 10 inches in diameter and 15 inches long, burning at the rate of one inch per second (15 seconds burning time) at 500 p. s. i., it is calculated that the amount of gas required to displace the grain as it burns is:

$$\pi(5)^2 \times \frac{500}{15} = 2620 \text{ cu. in. per sec.}$$

$$= 42 \text{ liters per sec.}$$

This rate would require burning about 40 grams of pressurizing fuel per second to just displace the grain. It is suggested that about 50 per cent excess be used (15 grams per second) and that the excess can be bled from the pressurizing space behind the grain to the main combustion chamber through a tube and suitable restricting orifice such as 67 of Figure 1, or 100, 105 and 110 of Figure 5 in order that the pressure on the grain is not sufficient to crush it. After all, the piston area on the butt of the grain of an average small rocket is about 80 sq. in. so that a differential pressure of a few p. s. i. should be sufficient to move the grain up.

The foregoing pressurizing fuel burns at the rate of 0.06 inch per second at 500 p. s. i., so that the 15×15= 225 grams of fuel should be 15×0.06=0.90 inch long. A star disc such as 109 of Figure 7 is preferred to give the proper burning rate in the present example.

While certain illustrative embodiments have been shown in the drawing and described in the specification, for purposes of explaining the invention, the invention obviously is not limited thereto.

Having described my invention, I claim:

1. A rocket comprising, in combination, a cylindrical combustion chamber having an axially disposed exhaust nozzle, a grate disposed across said chamber adjacent to and a predetermined fixed distance from said nozzle, a piston member in said chamber on the other side of said grate from said nozzle adapted to move in said chamber, a solid rocket propellant disposed between said grate and said piston member, a solid combustion-gas producing material in said chamber on the opposite side of said piston member from said propellant, means to ignite said combustion-gas producing material whereby the resulting combustion-gas pressure in said chamber on said opposite side of said piston member will move said piston member to bias said propellant against said grate continuously until said propellant is consumed, a by-pass conduit having a restricted orifice therein in communication with said chamber on opposite sides of said piston member, and means to ignite said propellant adjacent said grate.

2. A rocket comprising, in combination, a combustion chamber having an exhaust nozzle, a grate disposed across said chamber adjacent to and a predetermined fixed distance from said nozzle, a member in said chamber on the other side of said grate from said nozzle adapted to move in said chamber, a solid rocket propellant disposed between said grate and said member, a solid combustion-gas producing material in said chamber on the opposite side of said member from said propellant, means to ignite said combustion-gas producing material whereby the resulting combustion-gas pressure in said chamber on said opposite side of said member will move said member to bias said propellant against said grate, a by-pass conduit having a restricted orifice therein in communication with said chamber on opposite sides of said member, and means to ignite said propellant adjacent said grate.

3. A rocket comprising, in combination, a cylindrical combustion chamber having an axially disposed exhaust nozzle, a grate disposed across said chamber adjacent to and a predetermined fixed distance from said nozzle, a piston member in said chamber on the other side of said grate from said nozzle adapted to move in said chamber, a solid rocket propellant disposed between said grate and said piston member, a solid combustion-gas producing material in said chamber on the opposite side of said piston member from said propellant, means to ignite said combustion-gas producing material whereby the resulting combustion-gas pressure in said chamber on said opposite side of said piston member will move said piston member to bias said propellant against said grate, a by-pass conduit in communication with said chamber on opposite sides of said piston member, and means to ignite said propellant adjacent said grate.

4. A rocket comprising, in combination, a cylindrical combustion chamber having an axially disposed exhaust nozzle, a grate disposed across said chamber adjacent to and a predetermined fixed distance from said nozzle, a piston member in said chamber on the other side of said grate from said nozzle adapted to move in said chamber, a solid rocket propellant disposed between said grate and said piston member, a solid combustion-gas producing material in said chamber on the opposite side of said piston member from said propellant, means to ignite said combustion-gas producing material whereby the resulting combustion-gas pressure in said chamber on said opposite side of said piston member will move said piston member to bias said propellant against said grate continuously until said propellant is consumed, and means to ignite said propellant.

5. A rocket comprising, in combination, a combustion chamber having an exhaust nozzle, a grate disposed across said chamber adjacent to and a predetermined fixed distance from said nozzle, a member in said chamber on the other side of said grate from said nozzle adapted to move in said chamber, a solid rocket propellant disposed between said grate and said member, a solid combustion-gas producing material in said chamber on the opposite side of said member from said propellant, means to ignite said combustion-gas producing material whereby the resulting combustion-gas pressure in said chamber on said opposite side of said member will move said member to bias said propellant against said grate, a by-pass conduit in communication with said chamber on opposite sides of said member, and means to ignite said propellant.

6. A rocket comprising, in combination, a cylindrical combustion chamber having an axially disposed exhaust nozzle, a grate disposed across said chamber adjacent to and a predetermined fixed distance from said nozzle, a piston member in said chamber on the other side of said grate from said nozzle adapted to move in said chamber, a solid rocket propellant disposed between said grate and said piston member, a solid combustion-gas producing material in said chamber on the opposite side of said piston member from said propellant, means to ignite said combustion-gas producing material whereby the resulting combustion-gas pressure in said chamber on said opposite side of said piston member will move said piston member to bias said propellant against said grate, and means to ignite said propellant.

7. A rocket comprising, in combination, a combustion chamber having an exhaust nozzle, a grate disposed across said chamber adjacent to and a predetermined fixed distance from said nozzle, a member in said chamber on the other side of said grate from said nozzle adapted to move in said chamber, a solid rocket propellant disposed between said grate and said member, a solid combustion-gas producing material in said chamber on the opposite side of said member from said propellant, means to ignite said combustion-gas producing material whereby the resulting combustion-gas pressure in said chamber on said opposite side of said member will move said member to bias said propellant against said grate, and means to ignite said propellant.

8. The combination of claim 2 in which the by-pass conduit is in the wall of the chamber.

9. The combination of claim 5 in which the by-pass conduit is in the wall of the chamber.

10. The combination of claim 2 in which the by-pass conduit runs through the member.

11. The combination of claim 5 in which the by-pass conduit runs through the member.

12. A rocket comprising, in combination, a combustion chamber having an exhaust nozzle, a grate disposed across said chamber adjacent to and a predetermined fixed distance from said nozzle, a member in said chamber on the other side of said grate from said nozzle adapted to move in said chamber, a solid rocket propellant disposed between said grate and said member, a solid combustion-gas producing material in said chamber on the opposite side of said member from said propellant, means to ignite said combustion-gas producing material whereby the resulting combustion-gas pressure in said chamber on said opposite side of said member will move said member to bias said propellant against said grate, and means to ignite said propellant adjacent said grate.

13. The combination of claim 2 in which the propellant is in the form of an end-burning grain.

14. The combination of claim 12 in which the propellant is in the form of an end-burning grain.

15. The combination of claim 4 in which the combustion-gas producing material is in the form of an end-burning grain.

16. The combination of claim 7 in which the combustion-gas producing material is in the form of an end-burning grain.

17. The combination of claim 7 in which the combustion-gas producing material is in the form of a uniform burning-area grain.

18. The combination of claim 7 with a delay fuse in the means to ignite the propellant, whereby said combustion-gas production will bias said member before the propellant is ignited.

19. The combination of claim 7 in which the combustion-gas producing material is in the form of a spiral fuse.

References Cited in the file of this patent

UNITED STATES PATENTS

| | | |
|---|---|---|
| 2,083,654 | Kochmann | June 15, 1937 |
| 2,597,641 | Hull et al. | May 20, 1952 |